C. A. BROWN & G. G. EARL.
HYDRAULIC SYSTEM.
APPLICATION FILED FEB. 14, 1914.
1,185,626.
Patented June 6, 1916.
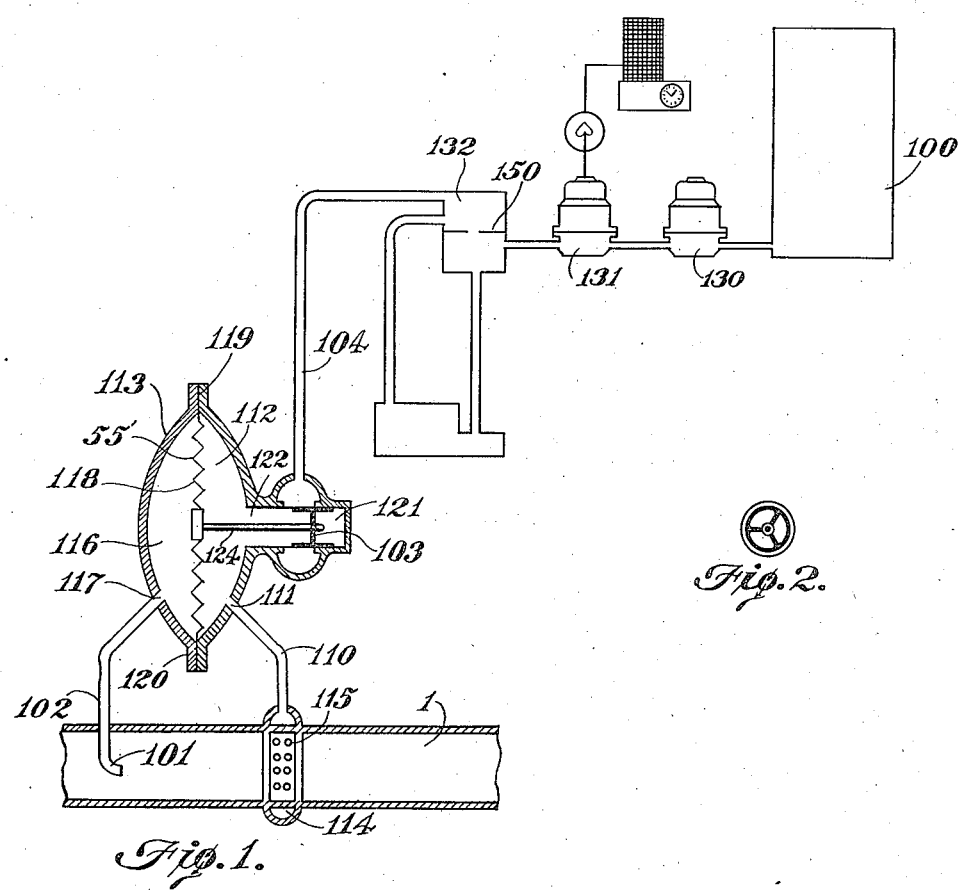

UNITED STATES PATENT OFFICE.

CHARLES A. BROWN, OF LORAIN, OHIO, AND GEORGE GOODELL EARL, OF NEW ORLEANS, LOUISIANA.

HYDRAULIC SYSTEM.

1,185,626.  Specification of Letters Patent.  Patented June 6, 1916.

Original application filed January 13, 1913, Serial No. 741,637. Divided and this application filed February 14, 1914. Serial No. 818,689.

*To all whom it may concern:*

Be it known that we, CHARLES A. BROWN, a citizen of the United States, residing at Lorain, in the county of Lorain and State of Ohio, and GEORGE G. EARL, a citizen of the United States, residing at New Orleans, in the parish of Orleans and State of Louisiana, have invented certain new and useful Improvements in Hydraulic Systems; and we do hereby declare the following to be a full, clear, and exact description of the invention, such as will enable others skilled in the art to which it appertains to make and use the same.

The invention relates to hydraulic systems, in which a functional flow may be created and utilized to operate apparatus, such as a measuring device, an integrating device, a recording device, means for supplying a chemical to the flow, or some other suitable apparatus.

In the particular embodiment of our invention illustrated in this application, we aim to create a functional flow from a source outside the main conduit, controlling the same through the flow in the conduit, and at the same time utilizing the functional flow for a balancing means.

Other objects of our invention and the invention itself will be better understood from a description of the embodiment illustrated.

Figure 1 shows a diagrammatic representation of an embodiment of our invention. Fig. 2 is an end elevation of a form of valve which we prefer to employ.

Referring now to the drawing and to the embodiment of our invention illustrated therein, at 1 is represented the main conduit through which fluid flows. The fluid may be caused to flow through the main by any suitable means, such as a pump or gravity. Suitable means are provided for educting from the main the pressures of the fluid therein. In the form shown we have employed a static tube including a duct 110 which leads to an orifice 111 in one of the cells 112 of the pressure chamber 113. In the form shown, we have created in the conduit a pressure chamber 114 and placed a screen 115 in the mouth thereof to prevent foreign substances from entering the duct 110. At 101, we show means for educting the velocity pressure here shown as a Pitot tube 101, which through the duct 102 communicates with a cell 116 in the chamber 113 through an orifice 117.

At 118 is shown a movable member, here illustrated as a movable diaphragm, preferably corrugated, to which the pressure educted by the static and velocity tubes is conveyed. This diaphragm is preferably held in position between the cells by clamping the edge of the diaphragm between the cells of the chamber, as shown at 119. We prefer to construct the chamber 113 by providing two sections and clamping the edges together, as shown at 120. We have shown a valve chamber 121 communicating with the cell 112 through any suitable means, such as a neck 122. A valve of any suitable form, here shown as a sliding cylindrical valve 103 is mounted in the valve chamber and is connected by a stem 124 to the diaphragm 118. A duct 104 communicates with the valve chamber and the flow of fluid therethrough is controlled by the valve. The duct 104 leads from a pressure source 100, here shown as a tank.

The fluid flowing through the duct 104 is utilized to operate apparatus, such as a meter 130, a recorder 131, and a manometer 132. We have here illustrated such devices as 130, 131 and 132 merely for the purpose of showing the uses for which the functional flow may be employed. Other forms of apparatus may likewise be operated by the functional flow.

The operation of the device is as follows: The flow of fluid through the main 1 is irregular owing to the changing demand placed upon it by the consumer. The static pressure in the main is conveyed by the duct 110 to the pressure chamber and in the form shown to the cell 112 upon the right hand side of the member 118. The sum of the velocity and static pressures is conveyed through the duct 102 to the left hand side of this member. As the pressure upon the left hand side is normally greater than that upon the right hand side, it is necessary to provide some third force to compensate for this difference. Hitherto, springs, weights and such devices have been employed, but we have employed the functional flow through the duct 104 for the purpose of the compensating pressure. Assuming that these forces are in balance when the apparatus is in the position shown in the drawing and that the flow increases through the main conduit 1, the pressure upon the left hand side of the diaphragm will increase, the diaphragm will be forced to the right, gradually opening the valve 103 and permitting a greater flow through the duct 104, the increase of which will be proportional to the increase in the flow in the main conduit. This increase in flow through 104 will also introduce an increased pressure upon the right hand side of the diaphragm, so that the same will be brought to balance when the valve 103 has been moved to such a position that the flow through the valve will be exactly functional with the flow through 1. The reverse action will take place when there is a decrease in flow through the main conduit 1 and the flow through 104 will thus be automatically regulated by the flow through the main conduit, so that the flow through 104 will always be proportional to that through 1. By recording or measuring the flow through the duct 104, it is possible to ascertain the flow through 1. A chemical may also be introduced into the flow through 104 for the purpose of impregnating the flow through the conduit 1. The bottom of the tank 100 is set at a sufficient elevation so that when the tank 100 is practically empty, there will still be sufficient head to compensate for the differential pressures in chambers 112—116 or the pressures created therein by 110—102. The valve 103 will automatically adjust itself as a throttling valve to compensate for the difference of head existing in 100 when full, partially full or practically empty, and will only open far enough or close far enough to allow of enough liquid flow into 112 to compensate for the differential pressure created in 112—116 through 110—102. The resistance created through 111—110—115 will always remain a constant, hence the flow through these members will always be functional to that through 1. Thus, the pressures created in 112—116 through 110—102 plus that created in 112 through 100—104 and 103 are always balanced, and as the resistance in 111—110 and 115 is less than the pressure existing in 112, a functional flow into 1 through 100—104—103—112—111—110 and 115 is always assured.

At 150 we show an orifice through which we may regulate the pressure developed in the pressure chamber by the fluid flowing through 104, this orifice being employed to offer resistance to the flow, if desired.

We have illustrated this embodiment of our invention, not with any intention of being limited to the details of the apparatus shown therein, since we contemplate numerous and extensive departures from such form and details.

This application is a division of our application #741,637, filed Jan. 13, 1913.

We claim:—

1. In a device of the class described, the combination of a fluid conduit, means for creating a flow of fluid in the conduit, a movable member, means transmitting the static and velocity pressures in said conduit to act on said member, a source of pressure independent of said conduit, a duct leading from said independent source to said member, means controlled by said member governing the flow of fluid through said duct, said duct communicating through said transmitting means with said conduit.

2. In a device of the class described, the combination of a conduit conducting a flow of fluid, a movable member, means for transmitting the static pressure of the fluid in said conduit to one side thereof, means to transmit the velocity pressure in said conduit to the other side of said member, a source of pressure independent of the conduit, a duct leading from said source to the static pressure side of said member and to said static pressure transmitting means, and a valve governing said duct controlled by said member.

3. In a device of the class described, the combination of a fluid conducting conduit, a movable member, a Pitot tube in said conduit, a pipe connecting said Pitot tube to one side of said member, a static tube in said conduit, a second pipe connecting said static tube with the other side of said member, a source of pressure independent of said conduit, a duct connecting said source with said second pipe and said movable member for introducing a functional flow to the conduit and the pressure of said independent source to the static side of said movable member, a valve in said duct and means connected to the movable member through which said movable member moves said valve proportional to its own movement.

4. In a device of the class described, the combination of a main conduit through which a fluid flows, a pressure cell, means for conveying the static pressure in said conduit to said cell, a second cell, means to convey the velocity and static pressures to said second cell, a source of pressure, a duct leading from said source through which fluid may pass from said source to the main, means controlled by the pressures in the cells for regulating the flow through said duct, and means for conveying the flow through the duct to one of said pressure cells.

5. In a device of the class described, the combination of a main conduit, means for creating a flow of fluid through said conduit, a movable member, means for conveying the pressures caused by said flow in said conduit to said movable member, a duct through which fluid flows, means for conveying the fluid in the duct and the pressure thereof to said movable member, and mechanism controlled by said movable member regulating the flow through the duct.

6. In a device of the class described, the combination of a main conduit, a pair of pressure cells, a static tube communicating with one of said cells, a Pitot tube in the conduit communicating with the second of said cells, a source of pressure, a duct leading from said source and conveying fluid and pressure thereof to the static cell and means controlled by said movable member governing the flow through said duct.

7. In a device of the class described, the combination of a main conduit having fluid flowing therethrough, means for creating a flow of fluid through said conduit, a source of pressure independent of said means, a duct leading from said last named source to said conduit, apparatus controlled jointly by said pressure and the pressures caused by said flow, said duct hydraulically conveying the pressure from the independent source to said apparatus and mechanism governed by said apparatus controlling the flow of fluid through said duct.

8. In a device of the class described, the combination of a fluid conduit, a movable member, means including a duct for transmitting the effect of static pressure in said conduit to one side of said member, means including a duct for transmitting the effect of combined static and velocity pressure in said conduit to the other side of said member, an independent source of pressure, a duct connecting said source to the side of the movable member to which the effect of the static pressure in the conduit is transmitted and means coöperating with said movable member for maintaining equal pressures on each side of said movable member.

9. In a device of the class described, the combination of a fluid conduit, a movable member, means including a duct for transmitting static pressure in said conduit to one side of said member, means including a duct for transmitting combined static and velocity pressure in said conduit to the other side of said member, an independent source of pressure, a duct connecting said source to the side of the movable member to which the static pressure in the conduit is transmitted and means coöperating with said movable member for maintaining equal pressures on each side of said movable member.

10. In a device of the class described, the combination of a main conduit, means for causing a flow of fluid through said conduit and a plurality of fluid pressures therein, including static and velocity pressures, a pressure chamber including two cells, means for conveying a pressure in the conduit to one of said cells, means for conveying another pressure in the conduit to another of said cells, an outside pressure source, a duct connecting said outside pressure source with one of said cells, a movable member acted on by the above named pressures, a valve in said duct controlled by said movable member, the flow through the duct being introduced to the main conduit and apparatus actuated by the flow through the duct.

11. In a device of the class described, the combination of a main conduit, a static tube in said conduit, a pressure cell communicating with the static tube, a Pitot tube in the conduit, a second pressure cell, a duct leading from the Pitot tube to the second pressure cell, a source of pressure, a duct leading from the source of pressure to the cell with which the static tube communicates, a movable member controlled by said pressures, a valve in said last named duct controlled by said movable member, the flow through said duct passing to the conduit through the static tube and apparatus actuated by the flow through the duct.

12. In a device of the class described, the combination of a fluid conduit through which fluid flows, a pressure chamber divided into two compartments or cells, pipes connecting said compartments with the main conduit and opening communication between said conduit and said cells, a source of pressure independent of said conduit, a duct for conducting fluid from said source to said pressure chamber, a valve associated with said duct controlling the flow therethrough, a movable member in said chamber controlled by the fluid pressures in said chamber, a stem connecting said valve to said movable member and an orifice in the path of the fluid flowing from said independent pressure source to said main.

13. In a device of the class described, the combination of a main fluid conduit through which fluid flows and in which fluid pressures are developed, including static and velocity pressures, a pressure chamber divided into two cells or compartments, means including a static tube connecting the periphery of the main with one of said cells and establishing open communication therewith whereby a pressure of one kind is transmitted to said cell, means including a Pitot tube connecting another section of said main with said second cell and establishing open communication therewith whereby a second and different kind of pressure is transmitted to said second cell, a movable member in said chamber, a source of pressure independent of said main, a duct leading from said independent source to one of said cells and conveying a flow of fluid proportional to the main flow from said source to said cell, a valve associated with the duct and controlling the flow of fluid therethrough, and a stem connecting said valve to said movable member through which the movable member operates the valve, said movable member being controlled and operated by the fluid pressures in the pressure chamber, the path of the functional flow continuing from the chamber to the main conduit through one of said pipes.

14. In a device of the class described, the combination of a fluid conduit, a movable member, means including a duct to transmit the static pressure in said conduit to one side of said member, means including a second duct to transmit another pressure from said conduit to the other side of said movable member, said first and second named means maintaining the difference in said pressures functional to the flow of fluid in the conduit, an independent source of pressure connected to the side of the movable member to which the lesser of said first named sources of pressure is transmitted and mechanism including said movable member for maintaining the pressure on the two sides of the movable member in equilibrium.

15. In a fluid regulating system, a fluid chamber, a fluid-tight movable division therein creating thereof two pressure cells, a source of a varying fluid pressure acting in one of said cells, a source of higher pressure and an outlet of lower pressure than the said varying fluid pressure, a fluid passage-way from said source to said outlet connected with the other of said pressure cells between said source and said outlet, and means including a valve operated by said movable division governing the flow of fluid from said source to said outlet to maintain the pressure in the last named pressure cell equal to the varying pressure in the first named cell.

In witness whereof, we have affixed our signatures in the presence of witnesses this 29th day of September, 1913.

CHARLES A. BROWN.

Witnesses:
G. A. RESEK,
LAURA M. GRUBBS.

GEORGE GOODELL EARL.

Witnesses:
JOHN C. BARTLEY,
S. E. HOTTINGER.